United States Patent
Ham (10) Patent No.: US 7,065,372 B2
(45) Date of Patent: Jun. 20, 2006

(54) INTERACTIVE SHORT MESSAGE SERVICE SYSTEM IN A PRIVATE WIRELESS NETWORK AND ROUTING METHOD THEREFOR

(75) Inventor: Young-Cheol Ham, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 10/337,982

(22) Filed: Jan. 8, 2003

(65) Prior Publication Data

US 2003/0144015 A1    Jul. 31, 2003

(30) Foreign Application Priority Data

Jan. 29, 2002 (KR) .................................. 2002-5159

(51) Int. Cl.
*H04Q 7/20* (2006.01)
(52) U.S. Cl. ...................... 455/466; 455/428; 455/462; 455/555; 455/550.1; 370/328; 370/349
(58) Field of Classification Search ................ 455/466, 455/550.1, 462, 403, 555, 433; 370/328, 370/349
See application file for complete search history.

(56) References Cited

U.S. PATENT DOCUMENTS

| | | | |
|---|---|---|---|
| 5,878,397 A | | 3/1999 | Stille et al. |
| 5,887,256 A | * | 3/1999 | Lu et al. .................. 455/426.1 |
| 5,901,352 A | | 5/1999 | St-Pierre et al. |

(Continued)

FOREIGN PATENT DOCUMENTS

KR    2001-8805    2/2001

(Continued)

OTHER PUBLICATIONS

"*Examiner's first Report*" issued by Australian Patent Office dated on Oct. 31, 2003.

*Primary Examiner*—Sonny Trinh
*Assistant Examiner*—Khai Nguyen
(74) *Attorney, Agent, or Firm*—Robert E. Bushnell, Esq.

(57) ABSTRACT

An interactive short message service (SMS) system, which can offer an interactive short message service even in a private wireless network, and a routing method therefor are disclosed. The interactive short message service system in a private wireless network, which is interworked with a public land mobile network (PLMN) and provides a public mobile communication service and a private wireless network service to a mobile station (MS), includes a private base station controller (pBSC) for performing routing to the private wireless network through a private mobile switching center (pMSC), or routing to the public land mobile network through a base station controller (BSC) of the public land mobile network, according to a destination address of an initial originating message when there is a request for an interactive short message service through a private base transceiver station (pBTS) from the mobile station, a private short message service center (pSMSC) connected to the private mobile switching center, and an interactive short message service server for communicating with the private short message service center (pSMSC) and providing the interactive short message service to the mobile station according to routing performed by the private base station controller (pBSC) to the private wireless network.

20 Claims, 2 Drawing Sheets

U.S. PATENT DOCUMENTS

| | | |
|---|---|---|
| 5,915,222 A * | 6/1999 | Olsson et al. ............... 455/466 |
| 6,081,534 A | 6/2000 | Sipila |
| 6,208,870 B1 | 3/2001 | Lorello et al. |
| 6,219,557 B1 | 4/2001 | Havinis |
| 6,256,497 B1 * | 7/2001 | Chambers ................... 455/433 |
| 6,292,669 B1 * | 9/2001 | Meuronen et al. .......... 455/466 |
| 6,385,452 B1 | 5/2002 | Zadeh et al. |
| 6,442,159 B1 * | 8/2002 | Josse et al. ................. 370/354 |
| 6,496,704 B1 * | 12/2002 | Yuan .......................... 455/466 |
| 6,856,808 B1 * | 2/2005 | Comer et al. ............... 455/466 |
| 6,873,849 B1 * | 3/2005 | de la Red et al. .......... 455/445 |
| 2002/0103929 A1 * | 8/2002 | Molnar ....................... 709/239 |
| 2002/0159387 A1 * | 10/2002 | Allison et al. .............. 370/229 |
| 2003/0054803 A1 * | 3/2003 | Carlton et al. .............. 455/414 |
| 2003/0081565 A1 * | 5/2003 | McIntosh et al. ........... 370/328 |
| 2003/0119532 A1 * | 6/2003 | Hatch ......................... 455/466 |
| 2004/0018833 A1 * | 1/2004 | Praestgaard ............... 455/422.1 |
| 2005/0119015 A1 * | 6/2005 | Linkola ...................... 455/466 |

FOREIGN PATENT DOCUMENTS

| | | |
|---|---|---|
| KR | 2001-9932 | 2/2001 |
| KR | 2001-16835 | 3/2001 |

\* cited by examiner

INTERACTIVE SHORT MESSAGE SERVICE SYSTEM IN A PRIVATE WIRELESS NETWORK AND ROUTING METHOD THEREFOR

CLAIM OF PRIORITY

This application makes reference to, incorporates the same herein, and claims all benefits accruing under 35 U.S.C. §119 from my application INTERACTIVE SHORT MESSAGE SERVICE SYSTEM IN PRIVATE MOBILE NETWORK AND ROUTING METHOD THEREFOR filed with the Korean Industrial Property Office on 29 Jan. 2002 and there duly assigned Serial No. 5159/2002.

BACKGROUND OF THE INVENTION

1. Technical Field

The present invention relates generally to a mobile communication service which interworks a private wireless network with a public land mobile network (PLMN), and in particular, to an interactive short message service (SMS) system.

2. Related Art

A public land mobile network (PLMN) can be a cellular network for use with mobile cellular radio communications. A public land mobile network generally includes equipment installed at a number of different locations. Each location includes a mobile switching center (MSC) and a visitor location register (VLR). The mobile switching center provides a circuit switched connection of speech and signaling information between a mobile station and the public land mobile network.

The mobile switching center is in communication with at least one base station controller (BSC). The base station controller is in communication with at least one base transceiver station (BTS). The base transceiver station is the physical equipment, including a radio tower, for example, that provides radio coverage to a region or cell.

A short message service (SMS) generally is a low-bandwidth, wireless, two-way service which allows a user to transmit and receive alphanumeric messages between mobile systems and external systems that support paging and e-mail. A person can use a mobile device such as a portable computer, pager, or cellular telephone to request information from a short message service server. The user can request weather information, sports information, financial information, news, and other information.

When different systems and components are in communication with each other, and are working together to perform some function, these different systems and tasks can be said to be interworking. Such interworking generally is facilitated when common standards are used to define the interfaces between the different systems and components. Typically, the different systems and components would not be able to be used together without the implementation of such common standards. An interface can be used to facilitate such interworking. When two distinctly different types of networks are interworked using an interface implementing standard network protocols, then communication can occur between the networks.

It would be desirable for a person to be able to use a mobile device to access both a first short message service server and a second short message service server, when the first server is part of a private wireless network and the second server is part of a public land mobile network (PLMN). There are benefits to enabling such access, because such access can be more cost-effective, and can give the user more services, flexibility, and convenience.

In view of the foregoing, it would be desirable to develop a system and method providing an interactive short message service in a private wireless network, and providing a mobile communication service which conveniently interworks a private wireless network with a public land mobile network (PLMN) for interactive short message service (SMS) communications.

SUMMARY OF THE INVENTION

The present invention provides an interactive short message service (SMS) system which can offer an interactive short message service even in a private wireless network and a routing method therefor.

In accordance with an aspect of the invention, an interactive short message service system in a private wireless network, which is interworked with a public land mobile network (PLMN) and provides a public land mobile network service and a private wireless network service to a mobile station (MS), includes a private base station controller (pBSC) for performing routing to the private wireless network through a private mobile switching center (pMSC) or routing to the public land mobile network through a base station controller (BSC) of the public land mobile network, according to a destination address of an initial originating message when there is a request for an interactive short message service through a private base transceiver station (pBTS) from the mobile station, a private short message service center (pSMSC) connected to the private mobile switching center, and an interactive short message service server for communicating with the private short message service center (pSMSC) and providing the interactive short message service to the mobile station according to routing performed by the private base station controller (pBSC) to the private wireless network.

In accordance with another aspect of the invention, a routing method for an interactive short message service includes the steps of confirming, at a private base station controller (pBSC), whether a mobile station has been registered in a private wireless network when there is a request for the interactive short message service through a private base transceiver station (pBTS) from the mobile station, performing routing to a public land mobile network through a base station controller (BSC) of the public land mobile network when the mobile station has been not registered in the private wireless network, analyzing a destination address of an initial originating message when the mobile station has been registered in the private wireless network, performing routing to the private wireless network through a private mobile switching center when the destination address contains a private prefix, and performing routing to the public land mobile network through the base station controller (BSC) of the public land mobile network when the destination address contains a public prefix.

In accordance with the principles of the present invention, as embodied and broadly described, the present invention provides a communication system, comprising: a short message service (SMS) system in a private wireless network, the private wireless network being in communication with a public land mobile network, said short message service system providing a public land mobile network service from the public land mobile network to a mobile station, said, short message service system providing a private wireless network service from the private wireless network to the mobile station. The short message service system comprises:

a private base station controller receiving a request for an interactive short message service from the mobile station, said private base station controller performing a routing operation in response to the received request, the routing operation being selected from among routing the request to the private wireless network and routing the request to a base station controller of the public land mobile network, the routing operation being selected in dependence upon a destination address of an initial originating message corresponding to the request; and a short message service server connected to said private base station controller and providing the interactive short message service to the mobile station when said private base station controller routes the request to the private wireless network.

In accordance with the principles of the present invention, as embodied and broadly described, the present invention provides a routing method for a communication system, the method comprising: detecting whether a mobile station has been registered in a private wireless network when a request for an interactive short message service (SMS) is received from the mobile station, the private wireless network being in communication with a public land mobile network, the private wireless network including a private base station controller connected to a private base transceiver station and to a private mobile switching center, the private wireless network including a private short message service center connected to the private mobile switching center and to an interactive short message service server, the interactive short message service center providing the mobile station with the requested interactive short message service, said confirming being performed by the private base station controller when the request is received from the mobile station through the private base transceiver station; when the mobile station has not been registered in the private wireless network, routing the request to the public land mobile network through a base station controller of the public land mobile network; when the mobile station has been registered in the private wireless network, analyzing a destination address of an initial originating message corresponding to the request; when the analyzed destination address contains a private prefix, routing the request to the private wireless network through the private mobile switching center; and when the analyzed destination address contains a public prefix, routing the request to the public land mobile network through the base station controller of the public land mobile network.

In accordance with the principles of the present invention, as embodied and broadly described, the present invention provides a communication system, comprising: a short message service (SMS) system providing a public land mobile network service from a public land mobile network to a mobile unit, said short message service system providing a private wireless network service from a private wireless network to the mobile unit, the private wireless network being in communication with the public land mobile network. The short message service system comprises: a first unit receiving a request for a short message service from the mobile unit, said first unit performing a routing operation in response to the received request, the routing operation being selected from among routing the request to the private wireless network and routing the request to the public land mobile network, the routing operation being selected in dependence upon a destination address of the request; and a second unit connected to said first unit and providing the requested short message service to the mobile unit when said first unit routes the request to the private wireless network.

In accordance with the principles of the present invention, as embodied and broadly described, the present invention provides a routing method for a communication system, the method comprising: detecting whether a mobile station has been registered in a private wireless network when a request for an interactive short message service (SMS) is received from the mobile station, the private wireless network being in communication with a public land mobile network; when the mobile station has not been registered in the private wireless network, routing the request from the mobile station to the public land mobile network; when the mobile station has been registered in the private wireless network, analyzing a destination address of the request; when the analyzed destination address contains a private prefix, routing the request to the private wireless network; and when the analyzed destination address contains a public prefix, routing the request to the public land mobile network.

In accordance with the principles of the present invention, as embodied and broadly described, the present invention provides a computer-readable medium having a set of computer-executable instructions for performing a routing method for a communication system, the set of instructions comprising one or more instructions for: detecting whether a mobile station has been registered in a private wireless network when a request for an interactive short message service (SMS) is received from the mobile station, the private wireless network being in communication with a public land mobile network; when the mobile station has not been registered in the private wireless network, routing the request from the mobile station to the public land mobile network; when the mobile station has been registered in the private wireless network, analyzing a destination address of the request; when the analyzed destination address contains a private prefix, routing the request to the private wireless network; and when the analyzed destination address contains a public prefix, routing the request to the public land mobile network.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PRESENT INVENTION

While the present invention will be described more fully hereinafter with reference to the accompanying drawings, in which the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that, in the development of any actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Exemplars of recent efforts related to networking and communications include U.S. Pat. No. 5,878,397 to Stille et al., entitled METHOD FOR TRANSPORTING SHORT MESSAGES IN A WIRELESS TELECOMMUNICATIONS SYSTEM, issued on Mar. 2, 1999, U.S. Pat. No. 5,901,352 to St-Pierre et al., entitled SYSTEM FOR CONTROLLING MULTIPLE NETWORKS AND ASSOCIATED SERVICES, issued on May 4, 1999, U.S. Pat. No. 5,915,222 to Olsson et al., entitled TRANSPORTING SHORT MESSAGE SERVICE (SMS) MESSAGES WITHIN A TELECOMMUNICATIONS NETWORK, issued on Jun. 22, 1999, U.S. Pat. No. 6,081,534 to Sipila, entitled IMPLEMENTATION OF MUTUAL RATE ADAPTATIONS IN DATA SERVICES BETWEEN GSM AND DECT, issued on Jun. 27, 2000, U.S. Pat. No. 6,219,557 to Havinis, entitled SYSTEM AND METHOD FOR PROVIDING LOCATION SERVICES IN PARALLEL TO EXISTING SERVICES IN GENERAL PACKET RADIO SERVICES ARCHITECTURE, issued on Apr. 17, 2001, and U.S. Pat. No. 6,385,452 to Zadeh et al., entitled SYSTEM AND METHOD FOR DETERMINING ABSOLUTE TIME BASED UPON AIR INTERFACE TIMING IN TIME OF ARRIVAL BASED POSITIONING, issued on May 7, 2002.

In general, it can be difficult to interwork a private wireless network with a public land mobile network, and thus respective network subscribers have been provided with a mobile communication service only within their registered networks. Accordingly, service systems which interwork the private wireless network with the public land mobile network have been developed so that one can be provided with a mobile communication service through both the public land mobile network and the private wireless network, using a single mobile communication terminal, or a mobile station (MS).

Some systems are disclosed in, for example, Korean Patent Laid-Open No. 2001-9932, published on Feb. 5, 2001, entitled "Method for Handling a Termination Call to an Extension Terminal Between a Mobile Communication Network and a Private Switching Network", and Korean Patent Laid-Open No. 2001-16835, published on Mar. 5, 2001, entitled "Method for Handling a Termination Call to a Mobile Terminal Between a Mobile Communication Network and a Private wireless Network.

A mobile communication service supports an interactive short message service which provides a mobile station with various additional information using an interactive server. This interactive short message service is disclosed in, for example, Korean Patent Laid-Open No. 2001-8805, published on Feb. 5, 2001, entitled "Interactive Service Method Using a Wireless Mobile terminal." The disclosure provides various additional information services, such as still images, video images, and text information. For instance, stock quotations, railway ticket, airline ticket, hotel, sports event information, and more.

The public land mobile network has provided the interactive short message service, but the private wireless network has not provided the interactive short message service. Instead, the private wireless network performs routing to the public land mobile network when there is a request for the interactive short message service by the mobile station, thereby providing the interactive short message service to the mobile station through the public land mobile network.

However, even in the private wireless network, it is necessary to provide, as the interactive short message service, the contents according to characteristics of a local area in which the private wireless service is offered. Moreover, when the mobile station user uses the interactive short message service through the public land mobile network, the service may be provided free of charge only to a mobile station registered in the private wireless network.

An embodiment of the present invention will be described herein below with reference to the accompanying drawings. In the following description, well-known functions or constructions are not described in detail since they would obscure the invention in unnecessary detail.

Figure 1:
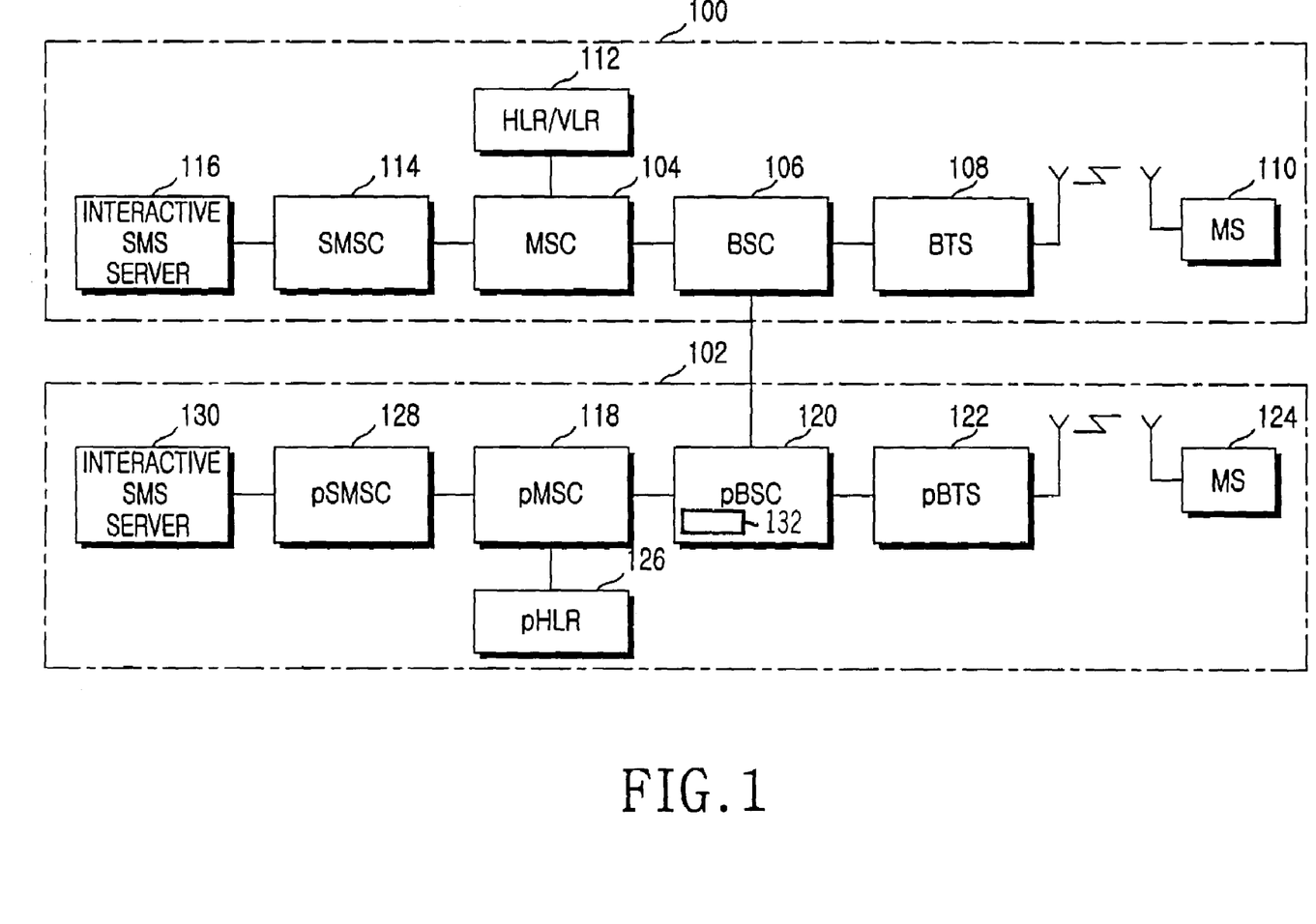
FIG. 1 is a block diagram illustrating a service system which interworks a private wireless network with a public land mobile network to provide an interactive short message service, in accordance with the principles of the present invention.

FIG. 1 is a block diagram illustrating a service system which interworks a private wireless network with a public land mobile network to provide an interactive short message service, in accordance with the principles of the present invention. Referring to FIG. 1, a service system according to the present invention interworks a private wireless network 102 with a general public land mobile network (PLMN) 100 to provide an interactive short message service.

The public land mobile network 100 includes a mobile switching center (MSC) 104, a base station controller (BSC) 106 connected to the mobile switching center (MSC) 104, and a base transceiver station (BTS) 108 connected to the base station controller (BSC) 106, thereby providing a mobile communication service to a mobile station (MS) 110. A home location register/visitor location register (HLR/VLR) 112, and a short message service center (SMSC) 114 for providing a short message service are connected to the mobile switching center (MSC) 104, and an interactive short message service server 116 with an interactive short message service application is connected to the short message service center (SMSC) 114, thereby providing an interactive short message service to mobile stations 110 and 124. As well known in the art, the mobile switching center (MSC) 104, base station controller (BSC) 106 and base transceiver station (BTS) 108 in the public land mobile network 100 are plural in number although the drawing shows only one of each.

The private wireless network 102 interworked with the public land mobile network 100 includes a private mobile switching center (pMSC) 118 connected to a private home location register (pHLR) 126 which is an inter-subscriber database, a private base station controller (pBSC) 120 connected to the private mobile switching center 118, and a private base transceiver station (pBTS) 122 connected to the private base station controller (pBSC) 120, thereby providing a mobile communication service through the public land mobile network 100 and the private wireless network 102 to the mobile station (MS) 124 subscribed in the public land mobile network 100 and the private wireless network 102. A private short message service center (pSMSC) 128 for providing a short message service is connected to the private mobile switching center 118, and an interactive short message service server 130 with an interactive short message service application is connected to the private short message service center (pSMSC) 128 to provide the mobile station 124 with an interactive short message service in the private wireless network 102.

To provide the interactive short message service in the private wireless network 102, all data burst messages transmitted via the private base transceiver station 122 to the private base station controller (pBSC) 120 should be separately routed to the public land mobile network 100 and the private wireless network 102. The routing of the interactive short message service message is performed by the private base station controller (pBSC) 120, specifically by a base transceiver station (BTS) message router (BTMR) 132 which is contained in the private base station controller (pBSC) 120 and which manages routing on a message received from the private base transceiver station 122. Generally, the base transceiver station message router (BTMR) 132 is interworked with the base station controller (BSC) 106 of the public land mobile network 100, and routes a radio call for the mobile station 124 to the public land mobile network 100 and the private wireless network 102. If the radio call is for the public land mobile network 100, the base transceiver station message router (BTMR) 132 routes the radio call to the public land mobile network 100 through the base station controller (BSC) 106. If the radio call is for the private wireless network 102, the base transceiver station message router (BTMR) 132 routes the radio call to the private mobile switching center 118.

Figure 2:
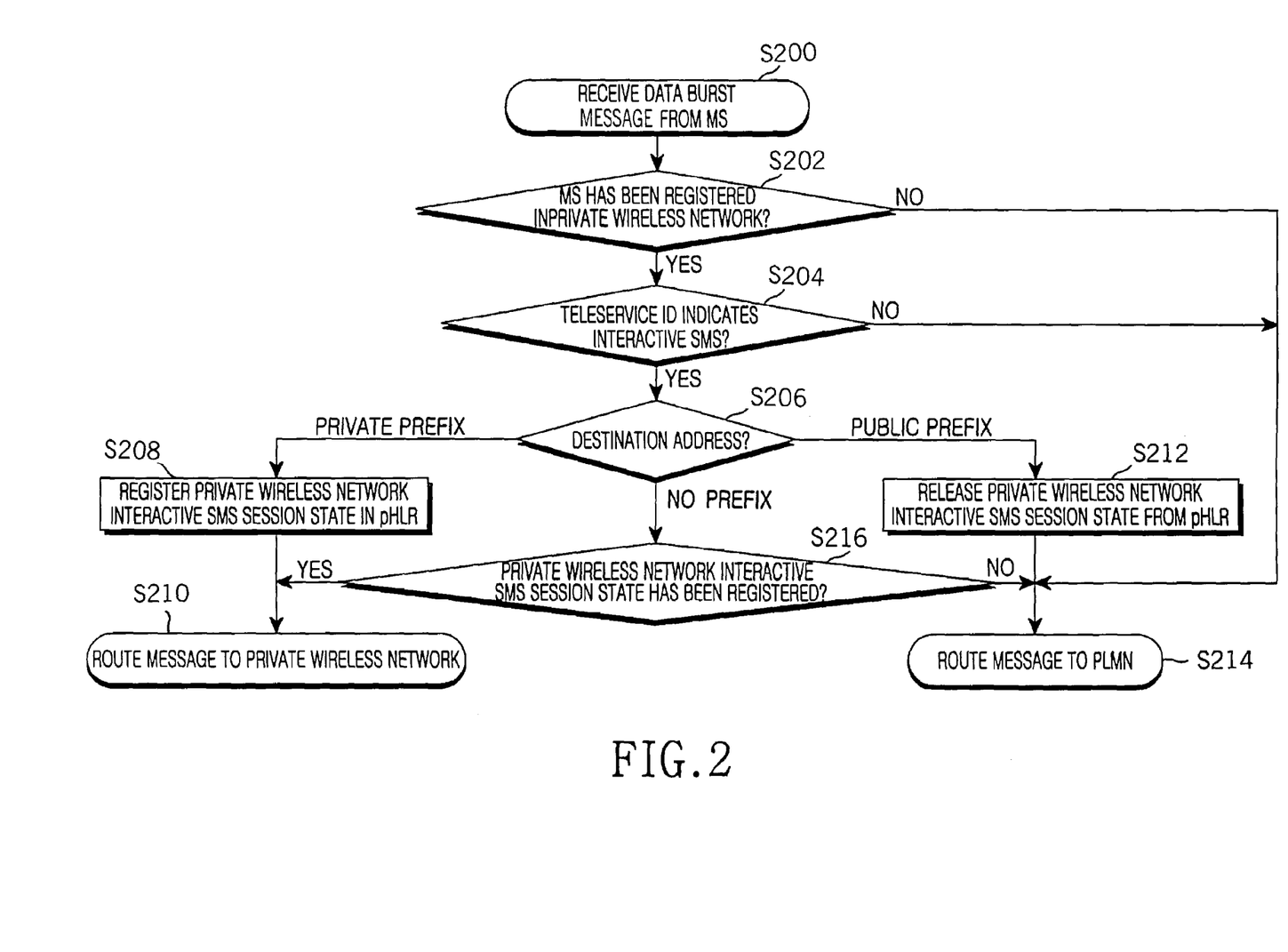
FIG. 2 is a flow chart illustrating a routing process of a private base station controller (pBSC) to provide an interactive short message service, in accordance with the principles of the present invention.

FIG. 2 is a flow chart illustrating a routing process of a private base station controller (pBSC) to provide an interactive short message service, in accordance with the principles of the present invention. A routing process of the private base station controller (pBSC) 120 for an interactive short message service requested by the mobile station 124 will now be described with reference to FIG. 2. At step S200, when the mobile station 124 transmits a data burst message for requesting a short message service to the private base transceiver station 122 of the private wireless network 102, the private base station controller (pBSC) 120 receives the data burst message from the mobile station 124. At step S202, it is determined whether the mobile station 124 has been registered in the private wireless network 102. At step S214, when the mobile station 124 has not been registered in the private wireless network 102, the private base station controller (pBSC) 120 routes the data burst message to the public land mobile network 100 through the base station controller (BSC) 106.

At step S204, when the mobile station 124 has been registered in the private wireless network 102, the private base station controller (pBSC) 120 checks a teleservice identifier (ID) from international standard (IS) 637-A format within the data burst message. A short message service uses IS-95B or IS-95C protocol, and a teleservice layer, which is an application layer of the short message service, uses IS-637 protocol. The base station controller (BSC) 106 and the mobile switching center (MSC) 104 of the public land mobile network 100 have only a transfer function to an upper layer irrespective of the IS-637 protocol. For this reason, the private base station controller (pBSC) 120 of the existing private wireless network 102 has routed the message only to the base station controller (BSC) 106 of the public land mobile network (PLMN) 100 with respect to the interactive short message service requested by the mobile station 124.

However, according to the present invention, the private base station controller (pBSC) 120 checks the teleservice identifier (ID). At step S204, when the teleservice identifier indicates a general short message service, then the step S214 is performed. At step S206, when the teleservice identifier (ID) indicates the interactive short message service, the private base station controller (pBSC) 120 analyzes a destination address for the IS-637-A format.

In an initial originating message, a connection symbol entered by a user of the mobile station 124 is formatted to the destination address. Therefore, the user separately enters the symbol to distinguish the interactive short message service over the public land mobile network 100 from the interactive short message service over the private wireless network 102. For example, when requesting the interactive short message service over the public land mobile network 100, the user enters "*+numeral", that is, "*" and a prescribed "numeral" as a public prefix. When requesting the interactive short message service over the private wireless network 102, the user enters "#" as a private prefix.

At step S208, when the destination address contains the private prefix at step S206, the private base station controller (pBSC) 120 registers a private wireless network interactive short message service session state in the private home location register (pHLR) 126. At step S210, the pBSC 120 routes the message to the private wireless network 102 through the private mobile switching center 118 after step S208 is performed. Hence, the interactive short message service is provided to the mobile station 124 through the interactive short message service server 130 of the private wireless network 102.

At step S212, when the destination address contains the public prefix at step S206, the private base station controller (pBSC) 120 releases the private wireless network interactive short message service session state from the private home location register (pHLR) 126. At step S214, the private base station controller (pBSC) 120 routes the message to the public land mobile network 100 through the base station controller (BSC) 106 of the public land mobile network 100 after step S212 is performed. Therefore, the interactive short message service is provided to the mobile station 124 through the interactive short message service server 116 of the public land mobile network (PLMN) 100.

After the message for the interactive short message service initially originates, applications of the mobile station 124 and the interactive short message service server 116 or 130 exchange messages at an application level, and maintain the interactive short message service session. In this case, if there is no detailed information at the application level of the base transceiver station message router (BTMR) of the private base station controller (pBSC) 120, the message cannot be routed. This is true because, while the initial originating message for the interactive short message service contains the private or public prefix in the destination address, the next message does not contain a private prefix or a public prefix.

To solve this problem, the private base station controller (pBSC) 120 receiving the initial originating message for the interactive short message service from the mobile station 124 registers the private wireless network interactive short message service session state in the private home location register (pHLR) 126 at step 208, or releases it from the private home location register (pHLR) 126 at step 212, thereby indicating whether the private wireless network interactive short message service session state has been registered or released. Thereafter, a message received from the mobile station 124 is routed with reference to the private wireless network interactive short message service session state indicated in the private home location register (pHLR) 126.

For this, a short message service session field "SMS_Session" is added to general subscriber information of the private home location register (pHLR) 126 as shown in Table 1 and Table 2 to display the private wireless network interactive short message service session state. Table 1 shows the short message service session field "SMS_Session" having a value "ON" which indicates that the private wireless network interactive short message service session state has been registered, and Table 2 shows the short message service session field "SMS_Session" having a value "OFF" which indicates that the private wireless network interactive short message service session state has been released.

TABLE 1

| Field | Value |
|---|---|
| MS_Tel | 1200 |
| MS_Min | 0162001200 |
| . | . |
| . | . |
| . | . |
| ESN_Number | BB4567AA |
| Name | Hong Gil-Dong |
| . | . |
| . | . |
| . | . |
| SMS_Session | ON |
| . | . |
| . | . |
| . | . |

TABLE 2

| Field | Value |
|---|---|
| MS_Tel | 1200 |
| MS_Min | 0162001200 |
| . | . |
| . | . |
| . | . |
| ESN_Number | BB4567AA |
| Name | Hong Gil-Dong |
| . | . |
| . | . |
| . | . |
| SMS_Session | OFF |
| . | . |
| . | . |
| . | . |

If the received message is not the initial originating message for the interactive short message service, the destination address contains neither the public prefix nor the private prefix. Then, at step S216, the private base station controller (pBSC) 120 determines whether the private wireless network interactive short message service session state has been registered. At step S210, when the private wireless network interactive short message service session state has been registered as indicated in Table 1, the private base station controller (pBSC) 120 routes the message to the private wireless network 102 through the private mobile switching center (pMSC) 118. Thereafter, the mobile station 124 is continuously provided with the interactive short message service through the interactive short message service server 130 of the private wireless network 102.

At step S214, when the private wireless network interactive short message service session state has been not registered as indicated in Table 2, the private base station controller (pBSC) 120 routes the message to the public land mobile network 100 through the base station controller (BSC) 106 of the public land mobile network (PLMN) 100. Thereafter, the mobile station 124 is continuously provided with the interactive short message service through the interactive short message service server 116 of the public land mobile network 100.

Therefore, not only the public land mobile network 100 but also the private wireless network 102 can provide the interactive short message service, and users can be provided with services for various contents offered by the interactive short message service server 130 of the private wireless network 102.

As described above, since the present invention can provide the interactive short message service even in the private wireless network, a user has an advantage of being provided with services for various contents offered by both the public land mobile network and the private wireless network. Furthermore, since the interactive short message service may be provided without charge only to the mobile station registered in the private wireless network, the interactive short message service can be economically used.

The mobile system 124 can be a mobile telephone such as a cellular telephone or a satellite telephone. The mobile station 124 can be a computer system such as a personal computer (PC), a portable computer, a notebook computer, a hand-held computer, a palm-sized computer, a wearable computer, or any other type of computer system able to engage in wireless communications. The mobile station 124 can be any device able to engage in wireless communications, including a pager.

In an embodiment of the present invention, the above-described steps of the present invention can be instructions stored in a memory, and the instructions stored in the memory can be performed by one or more computers. The memory could be any kind of computer readable medium such as floppy disks, conventional hard disks, removable hard disks, compact discs (CDs), digital versatile discs (DVDs), flash read only memory (flash ROM), nonvolatile read only memory, and random access memory (RAM), for example. As shown in FIG. 1, the private base station controller (pBSC) 120 can be a computer system including a hard disk drive 132.

In an embodiment of the present invention, at least one of the above-described steps of the present invention can correspond to an execution of instructions stored in one or more memory units. For example, one of these memory units could be the hard disk drive 132 installed in the private base station controller 120. Instructions stored in such a memory unit can be executed or performed by one or more computers. For example, instructions corresponding to some of the steps of the present invention can be stored in the hard disk drive 132 installed in the private base station controller (pBSC) 120.

A software implementation of the above-described embodiment may comprise a series of computer instructions either fixed on a tangible medium, such as computer readable media, for example a compact disc or a fixed disk, or transmissible to a computer system via a modem or other interface device over a medium. The medium can be either a tangible medium, including, but not limited to, optical or analog communications lines, or may be implemented with wireless techniques, including but not limited to microwave, infrared or other transmission techniques. The medium may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, for example, shrink wrapped software, pre-loaded onto a computer system, for example, in a system read only memory (ROM) or fixed disk, or distributed from a server or electronic bulletin board over a network, for example, the Internet or World Wide Web.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A communication system, comprising:
a short message service (SMS) system which is in communication with a private wireless network and a public land mobile network, said short message service system providing a public land mobile network service from the public land mobile network to a mobile station, said short message service system providing a private wireless network service from the private wireless network to the mobile station, said short message service system comprising:
a private base station controller for receiving a request for a short message service from the mobile station, said private base station controller performing a routing operation in response to the received request, the routing operation being selected from routing the request to the private wireless network and routing the request to a base station controller of the public land mobile network, the routing operation being selected in dependence upon a destination address of an initial originating message corresponding to the request; and
a short message service server connected to said private base station controller and providing the requested short message service to the mobile station when said private base station controller routes the request to the private wireless network;
said short message service system further comprising a private base transceiver station for separating the mobile station from said private base station controller, said private base transceiver station receiving the request from the mobile station and transferring the request to said private base station controller.

2. The communication system of claim 1, said private base station controller and said short message service server being in the private wireless network.

3. The communication system of claim 1, said short message service system further comprising a private base transceiver station for receiving the request from the mobile station and for transferring the request to said private base station controller, said short message service system further comprising a private mobile switching center for receiving the request from said private base station controller and transferring the request to said short message service server.

4. The communication system of claim 1, the mobile station being registered in the private wireless network.

5. The communication system of claim 1, said short message service system further comprising a private short message service center for receiving the request from said private base station controller and for transferring the request to said short message service server.

6. The communication system of claim 1, the private wireless network being connected to the public land mobile network when said private base station controller is connected to the base station controller of the public land mobile network.

7. The communication system of claim 1, said short message service system further comprising a private mobile switching center for separating said private base station controller from said short message service server, said private mobile switching center receiving the request from said private base station controller and transferring the request to said short message service server.

8. The communication system of claim 7, said short message service system further comprising a private short message service center for separating said private mobile switching center from said short message service server, said private short message service center receiving the request from said private mobile switching center and transferring the request to said short message service server.

9. A routing method for a communication system, the method comprising the steps of:
detecting whether a mobile station has been registered in a private wireless network when a request for an interactive short message service (SMS) is received from the mobile station, the private wireless network being in communication with a public land mobile network, the private wireless network including a private base station controller connected to a private base transceiver station and to a private mobile switching center, the private wireless network including a private short message service center connected to the private mobile switching center and to an interactive short message service server, the interactive short message service server providing the mobile station with the requested interactive short message service, said detecting being performed by the private base station controller when the request is received from the mobile station through the private base transceiver station;
when the mobile station has not been registered in the private wireless network, routing the request to the public land mobile network through a base station controller of the public land mobile network;
when the mobile station has been registered in the private wireless network, analyzing a destination address of an initial originating message corresponding to the request;
when the analyzed destination address contains a private prefix, routing the request to the private wireless network through the private mobile switching center; and
when the analyzed destination address contains a public prefix, routing the request to the public land mobile network through the base station controller of the public land mobile network.

10. The method of claim 9, said routing of the request to the private wireless network comprising registering a private wireless interactive short message service session state in a private home location register connected to the private mobile switching center.

11. The method of claim 10, said routing of the request to the public land mobile network, when the mobile station has been registered in the private wireless network, comprising releasing the private wireless network interactive short message service session state from the private home location register.

12. The method of claim 11, further comprising the steps of:
- when the analyzed destination address does not contain the public prefix and does not contain the private prefix, determining whether the private wireless network interactive short message service session state has been registered in the private home location register;
- when the private wireless network interactive short message service session state has been registered, routing the request to the private wireless network; and
- when the private wireless network interactive short message service session state has not been registered, routing the request to the public land mobile network.

13. A communication system, comprising:
- a short message service (SMS) system providing a public land mobile network service from a public land mobile network to a mobile unit, said short message service system providing a private wireless network service from a private wireless network to the mobile unit, the private wireless network being in communication with the public land mobile network, said short message service system comprising:
  - a first unit for receiving a request for a short message service from the mobile unit, said first unit performing a routing operation in response to the received request, the routing operation being selected from routing the request to the private wireless network and routing the request to the public land mobile network, the routing operation being selected in dependence upon a destination address of the request; and
  - a second unit connected to said first unit and providing the requested short message service to the mobile unit when said first unit routes the request to the private wireless network;
- said short message service system further comprising a private base transceiver station located in the private wireless network and separating the mobile unit from said first unit, said private base transceiver station receiving the request from the mobile unit and transferring the request to said first unit.

14. The communication system of claim 13, said short message service system further comprising:
- a private mobile switching center located in the private wireless network and separating said first unit from said second unit, said private mobile switching center receiving the request from said first unit and transferring the request to said second unit; and
- a private short message service center located in the private wireless network and separating said private mobile switching center from said second unit, said private short message service center receiving the request from said private mobile switching center and transferring the request to said second unit, said routing of the request to the public land mobile network including transmitting the request from said first unit to a base station controller of the public land mobile network.

15. A routing method for a communication system, the method comprising the steps of:
- detecting whether a mobile station has been registered in a private wireless network when a request for an interactive short message service (SMS) is received from the mobile station, the private wireless network being in communication with a public land mobile network;
- when the mobile station has not been registered in the private wireless network, routing the request from the mobile station to the public land mobile network;
- when the mobile station has been registered in the private wireless network, analyzing a destination address of the request;
- when the analyzed destination address contains a private prefix, routing the request to the private wireless network; and
- when the analyzed destination address contains a public prefix, routing the request to the public land mobile network.

16. The method of claim 15, said routing of the request to the private wireless network comprising registering a private wireless interactive short message service session state in a private home location register connected in the private wireless network.

17. The method of claim 16, said routing of the request to the public land mobile network, when the mobile station has been registered in the private wireless network, comprising releasing the private wireless network interactive short message service session state from the private home location register.

18. The method of claim 17, further comprising the steps of:
- when the analyzed destination address does not contain the public prefix and does not contain the private prefix, determining whether the private wireless network interactive short message service session state has been registered in the private home location register;
- when the private wireless network interactive short message service session state has been registered, routing the request to the private wireless network; and
- when the private wireless network interactive short message service session state has not been registered, routing the request to the public land mobile network.

19. The method of claim 18, said routing of the request to the public land mobile network and to the private wireless network being performed by a private base station controller, the private base station controller being connected to a base station controller of the public land mobile network to perform said routing of the request to the public land mobile network.

20. A routing method for a communication system, the method comprising the steps of:
- detecting whether a mobile station has been registered in a private wireless network when a request for an interactive short message service (SMS) is received from the mobile station, the private wireless network being in communication with a public land mobile network;
- when the mobile station has not been registered in the private wireless network, routing the request from the mobile station to the public land mobile network;
- when the mobile station has been registered in the private wireless network, analyzing a destination address of the request;
- when the analyzed destination address contains a private prefix, routing the request to the private wireless network; and
- when the analyzed destination address contains a public prefix, routing the request to the public land mobile network;
- said routing of the request to the public land mobile network, when the mobile station has been registered in the private wireless network, comprising releasing the private wireless network interactive short message service session state from the private home location register.

* * * * *